US011322991B2

(12) United States Patent
Alpert et al.

(10) Patent No.: US 11,322,991 B2
(45) Date of Patent: May 3, 2022

(54) FLEXIBLE MANAGEMENT SYSTEM FOR OPTICAL WIRELESS POWER SUPPLY

(71) Applicant: Wi-Charge Ltd., Rehovot (IL)

(72) Inventors: Ortal Alpert, Ness Ziona (IL); Ran Sagi, Tel Aviv (IL); Ori Refael Mor, Tel Aviv (IL); Lior Golan, Ramat Gan (IL); Yoav Biderman, Tel Aviv (IL); Omer Nahmias, Aminadav (IL); Alexander Slepoy, Chandler, AZ (US); Zohar Levin, Rehovot (IL); Eyal Conforti, Tel Aviv (IL); Yan Rosh, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 43 days.

(21) Appl. No.: 16/613,533

(22) PCT Filed: May 15, 2018

(86) PCT No.: PCT/IL2018/050532
§ 371 (c)(1),
(2) Date: Nov. 14, 2019

(87) PCT Pub. No.: WO2018/211506
PCT Pub. Date: Nov. 22, 2018

(65) Prior Publication Data
US 2021/0091603 A1    Mar. 25, 2021

Related U.S. Application Data

(60) Provisional application No. 62/506,275, filed on May 15, 2017.

(51) Int. Cl.
*H04B 10/04*    (2006.01)
*H02J 50/30*    (2016.01)
(Continued)

(52) U.S. Cl.
CPC .............. *H02J 50/30* (2016.02); *H02J 50/60* (2016.02); *H04B 10/503* (2013.01); *H04B 10/564* (2013.01); *H04B 10/807* (2013.01)

(58) Field of Classification Search
CPC ........ H02J 50/30; H02J 50/60; H04B 10/503; H04B 10/564; H04B 10/807
(Continued)

(56) References Cited

U.S. PATENT DOCUMENTS

| 1,119,732 A | 12/1914 | Tesla |
| 3,174,705 A | 2/1965 | Schiff et al. |

(Continued)

FOREIGN PATENT DOCUMENTS

| WO | 1998013909 A2 | 4/1998 |
| WO | 2007036937 A2 | 4/2007 |

(Continued)

OTHER PUBLICATIONS

Office Action for U.S. Appl. No. 15/754,656, dated Apr. 20, 2020, 10 Pages.

(Continued)

*Primary Examiner* — Mohammad R Sedighian
(74) *Attorney, Agent, or Firm* — Maine Cernota & Rardin

(57) ABSTRACT

A safety supervision system for wireless power transmission, comprising a transmitter having an optical beam generator with safe states for transmitting power to receivers that convert the beam into electrical power. The system control unit stores previously known signatures categorized by predetermined parameters associated with one or more unwanted situations, stores data from sensors, compares this stored data to the signatures, and executes one or more responses based on this comparison. The system may comprise transmitter and/or receiver malfunction detection systems adapted to monitor the transmitter and receiver control (Continued)

units and to cause the optical beam generator to switch to a safe state upon detection of a transmitter or receiver control unit malfunction, and may further comprise a hazard detection system preventing human exposure to beam intensity above a predefined safe level.

25 Claims, 3 Drawing Sheets

(51) Int. Cl.
*H02J 50/60* (2016.01)
*H04B 10/50* (2013.01)
*H04B 10/564* (2013.01)
*H04B 10/80* (2013.01)

(58) Field of Classification Search
USPC ........................................................ 398/197
See application file for complete search history.

(56) References Cited

U.S. PATENT DOCUMENTS

| | | | |
|---|---|---|---|
| 3,370,986 | A | 2/1968 | Amsterdam et al. |
| 3,781,647 | A | 12/1973 | Glaser |
| 3,989,994 | A | 11/1976 | Brown |
| 4,493,085 | A | 1/1985 | Valley |
| 4,955,562 | A | 9/1990 | Martin et al. |
| 5,260,639 | A | 11/1993 | De Young et al. |
| 5,771,114 | A | 6/1998 | Anderson et al. |
| 6,407,535 | B1 | 6/2002 | Freidman et al. |
| 6,437,685 | B2 | 8/2002 | Hanaki |
| 6,534,705 | B2 | 3/2003 | Berrios et al. |
| 6,633,026 | B2 | 10/2003 | Tuominen |
| 6,687,036 | B2 | 2/2004 | Riza |
| 7,133,617 | B2 | 11/2006 | Oettinger |
| 7,741,734 | B2 | 6/2010 | Joannopoulas et al. |
| 7,786,419 | B2 | 8/2010 | Hyde |
| 8,168,930 | B2 | 5/2012 | Hyde et al. |
| 8,400,018 | B2 | 3/2013 | Joannopoulas et al. |
| 8,400,022 | B2 | 3/2013 | Joannopoulas et al. |
| 8,472,764 | B2 | 6/2013 | Chan et al. |
| 8,629,578 | B2 | 1/2014 | Kurs et al. |
| 8,835,823 | B2 | 9/2014 | Hyde et al. |
| 9,537,322 | B2 | 1/2017 | Reynolds |
| 2002/0071627 | A1 | 6/2002 | Smith |
| 2004/0227057 | A1 | 11/2004 | Tuominen et al. |
| 2006/0266917 | A1 | 11/2006 | Baldis et al. |
| 2007/0019693 | A1 | 1/2007 | Graham |
| 2008/0304826 | A1 | 12/2008 | Sochava |
| 2009/0103925 | A1 | 4/2009 | Alpert et al. |
| 2010/0079008 | A1 | 4/2010 | Hyde et al. |
| 2010/0320362 | A1* | 12/2010 | Alpert ..................... H01S 3/083 250/200 |
| 2012/0007445 | A1 | 1/2012 | Hyde |
| 2013/0234661 | A1 | 9/2013 | Yang |
| 2013/0264870 | A1 | 10/2013 | Keysar |
| 2013/0328417 | A1 | 12/2013 | Takeuchi |
| 2014/0092929 | A1 | 4/2014 | Alpert |
| 2014/0126603 | A1 | 5/2014 | Della-Pergola et al. |
| 2014/0175876 | A1 | 6/2014 | Cheatham, III et al. |
| 2015/0141086 | A1 | 5/2015 | Chan |
| 2016/0197494 | A1 | 7/2016 | Kwon et al. |
| 2017/0018976 | A1* | 1/2017 | Mor ........................ H02J 5/005 |
| 2019/0044393 | A1* | 2/2019 | Louis ................... H04B 5/0037 |

FOREIGN PATENT DOCUMENTS

| | | | |
|---|---|---|---|
| WO | 2008063678 | A1 | 5/2008 |
| WO | 2009083990 | A2 | 7/2009 |
| WO | 2011112795 | A1 | 9/2011 |
| WO | 20140896330 | A2 | 6/2014 |
| WO | 2014156465 | A1 | 10/2014 |
| WO | 2016187344 | A1 | 11/2016 |
| WO | WO-2016187344 | A1 * | 11/2016 ............. G01S 17/89 |
| WO | 2018211506 | A1 | 11/2018 |

OTHER PUBLICATIONS

Office Action for U.S. Appl. No. 16/111,192, dated Jul. 8, 2020, 20 Pages.
Barbara Stuart, first part of chapter 6 of "Infrared Spectroscopy: Fundamentals and Applications", 2004, John Wiley & Sons, Ltd.
International Search Report and Written Opinion of International Appl No. PCT/IL2016/050927, dated Dec. 15, 2016, 9 pages.
Supplementary European Search Report for Appl No. EP16823998.6 dated Nov. 5, 2018, 10 pages.
Supplementary European Search Report for Appl No. EP16838682.9 dated Dec. 6, 2018, 8 pages.
European Search Report for Appl No. 16838682.9 dated Dec. 6, 2018, 8 pages.
Extended Supplementary Search Report for EP Application 18803029. 0, dated Feb. 9, 2021, 11 pages.
PCT International Search Report and Written Opinion for Application No. PCT/IL2018/050532, dated Aug. 7, 2018, 11 pages.

* cited by examiner

FLEXIBLE MANAGEMENT SYSTEM FOR OPTICAL WIRELESS POWER SUPPLY

RELATED APPLICATIONS

This application is a national phase application filed under 35 USC § 371 of PCT Application No. PCT/IL2018/050532 with an International filing date of May 15, 2018, which claims priority of U.S. Provisional Patent 62/506,275 filed May 15, 2017. Each of these applications is herein incorporated by reference in its entirety for all purposes.

FIELD OF THE INVENTION

The present invention relates to the field of supervision of the various safety systems of wireless power transmission systems, especially as applied to laser beaming systems for powering and charging portable electronic devices.

BACKGROUND

To date, only three commercially available technologies allow wireless transfer of power to portable electronic devices using collimated, or essentially collimated, electromagnetic waves:

Magnetic induction—which is typically limited in range to just a few mm;

Solar cells—which cannot produce more than 0.1 Watt for the size relevant to cellphones;

Energy harvesting techniques—which cannot produce more than 0.01 W in relevant situations, such as harvesting electronic signals in a typical residential environment.

However, the typical battery of a portable electronic device is 1-100 Watt*hour, and a full charge generally lasts between a few hours and a week. Therefore, most portable devices, such as a cellphone, need much higher power at a much longer range. There is therefore a long felt, unmet need to transfer adequate electrical power, over a range larger than a few centimeters, safely, efficiently, cost effectively and conveniently to portable electronic devices, which are typically equipped with a rechargeable battery.

Furthermore, commercial availability of such products to the mass market is limited at the present time, since there are safety related problems that prevent such commercial products from being successfully launched. Most of the systems suggested in the prior art potentially expose users to various fields (e.g. RF, laser, magnetic, electric or Ultrasound), and as a result require some kind of safety system, designed to block user exposure to such fields. Many existing safety systems are designed to respond to "critical events", which are defined as events that, if not reacted to immediately, may allow radiation in excess of safe levels to be emitted in an uncontrolled manner from the system, and may cause harm to people or to property. For example, should a person penetrate the beam and be at risk, this would be considered "a critical event" and a safety system may react by stopping emission of the beam, for example, the laser beam.

A critical event, in the context of this disclosure is an event that, unless the appropriate action is taken, is likely to result in the system performing in an unsafe manner, or the system exceeding its safe or regulatory operational parameters. Typically, the needed response is immediate or due within a very short time frame after a critical event is detected.

Examples of critical events include:
1. Safety events
2. A person, animal, or object penetrating the beam
3. An indication of a safety breach
4. Human accessible emissions exceeding regulatory limits or accepted safety limits
5. Activation of emergency stop button
6. Unauthorized system intrusion Throughout the description and as claimed, the term non-critical event may be considered to be an event or situation that does not require a response within a short time frame, since it is unlikely to cause immediate damage, but could, if not detected and managed, develop into a critical event. Non-critical situations are often infrequent, but it is to be understood that non-critical situations may be frequent or cumulative, such as if dust is collecting over time on a component.

Prior art systems typically employ a hazard detection system which turns power transmission off when a risk of exposing humans to danger exists. However, such safety systems usually only react when a critical event happens, and the response to such a critical event is usually shutting down the entire system.

However, a typical residential environment is very diverse and dynamically changes in an unpredictable manner, so a configuration that may be desirable in one situation may not be desirable in another. Since, in such a changing environment, each situation is temporary, a modern residential environment highlights needs that were unimportant in prior art systems and become increasingly more important in such an environment, such as deliberate attempts to cause the system to fail, or repetitive failures of the system in a known situation that may be unique to a specific environment.

Prior art systems generally detect and react only to critical events and handle improperly, or do not react at all, to a multitude of such situations which are not critical but may be undesired or associated with a high probability of an undesired or even dangerous event. Most of the prior art is very limited in showing the capability of a system to adapt to changing situations. For example, prior art systems which stop operating when a foreign object crosses the path between the transmitter and the receiver are generally incapable of reacting to a changing situation in ways other than shutting the system down. Such a shutdown may, in fact, not be necessary and may result in energy loss, service interruption, and inefficient operation of the system.

To compound this problem, since prior art systems are designed to deliver safe performance during the majority of situations, wide margins are typically kept for such safety systems, causing the systems to shut down even when a non-threatening event is detected. For example, common household environments and routine usage, may include for example, contamination such as from dust and fingerprints, vibrations, blocking of a beam, unprofessional installation, and accidental falls to the floor. Since these exemplary non-critical situations are not deemed as "critical events", most prior art systems often do not react to them, although these situations may result in system malfunction, system inefficiency, and even dangerous outcomes. Alternatively, many prior art systems would react to such situations by disabling the system, often unnecessarily. These problems render such prior art systems unsuitable for use in a public environment.

Furthermore, in most prior art systems, if the safety systems would be neutralized or bypassed, the system would become dangerous. Most prior art systems are not designed to detect and respond to malicious attempts to disrupt the system from its safe operation manner.

Furthermore, there is a need for a wireless power system, suitable for use in a public environment that has a comprehensive safety system that complies with government regulations. Currently allowed laser power levels in the US are insufficient for providing useful amounts of power without a mandated, reliable and complex safety system. For example, the US, Code of Federal Regulations (CFR), title 21, volume 8, revised on April 2014, Chapter I, Subchapter J part 1040 deals with performance standards for light emitting products—laser products.

For non-visible wavelengths there exist, class I, class III-b and class IV lasers (class II, IIa, and IIIa are for lasers between 400 nm and 710 nm, e.g. visible lasers).

Of the non-visible wavelengths, class 1 is considered safe for general public use and classes IIIb and IV are considered unsafe.

The MPE (Maximal Permissible Exposure Value) for class I lasers, according to the US, CFR 21, volume 8, revised on April 2014, Chapter I, Subchapter J part 1040, for 0.1-60 seconds of exposure are shown in the graph of FIG. 1.

It can be seen from that graph that:
1. The Maximum Permissible Exposure Levels generally increase with wavelength and decrease with time duration of exposure.
2. Even if the laser is turned off 0.1 second after a person enters the beam, in order to meet the requirement specified in US-CFR 21, ~1040 no more than 1.25 W of light can be transmitted at wavelengths of greater than 2.5 µm, and much less at shorter wavelengths. Without a mandated reliable safety system, only a few milliwatts of laser power are allowed, which when converted back to electricity, would supply significantly less power than the power needed to charge most portable electronic devices (e.g. a cellular phone requires between 1 and 12 W for a full charging). It is well known in the art that fingerprints and dust scatter laser light, and that transparent surfaces can reflect or scatter it. If high power is to be transferred, such as for a typical phone charged using 1-12 W of electrical power, then, even after taking into account the conversion inefficiency from laser to electrical power (whose efficiency typically cannot exceed 50%), a laser power of 2-24 W would be needed.

Therefore, to charge such a typical phone, a laser having power corresponding to a class IV laser would be needed. For Class IV lasers, even scattered radiation from the main beam is dangerous. According to the US, CFR 21, volume 8, revised on April 2014, Chapter I, Subchapter J part 1040, lasers between 400 nm and 1400 nm above 0.5 W for exposure above 0.5 seconds are usually considered class IV lasers, and even scattered radiation from such lasers may be dangerous (but not scattering from absorbing elements designed specifically for ensuring laser safety). Such lasers are required to have various safety features, and require preventative warning and limiting features, such as a lock key, warning labels such as that shown in FIG. 2, and the user of the laser is usually required to wear safety goggles and undergo proper training. Therefore, without a flexible, comprehensive and robust safety system, class IIIb or class IV lasers cannot be suitable for public use.

However, there may be various safety systems that allow high power lasers to be classified as class I lasers, since these laser standards deal with human accessible emission. For example, if a high power laser is equipped with a safety system that does not allow humans access to the high power, it may be a class I laser, even if the power is very high. For instance, if a high power laser would be embedded in a protective enclosure that does not allow access to the laser beam, it may be considered a class I laser product and may be suitable for public use. For example, home laser printers are typically a class I laser product, although they have an embedded high power laser. In conclusion, there is a general agreement that a comprehensive safety system is needed to allow transfer of power using a laser in a normal public environment, though at the date of filing of this application, none appears to have been commercialized.

There therefore exists a need for a comprehensive optical wireless power supply flexible management system which is capable of reacting to changing situations, including those which fall in the categories of routine use, misuse, and abuse, in a safe manner and which overcomes at least some of the disadvantages of prior art systems and methods.

Prior art describing various optical wireless power supply systems can be found in U.S. Pat. No. 9,312,701, U.S. patent application Ser. No. 15/069,384, 62/208,878, 62/307,878, 62/320,679, and 62/363,660.

The disclosures of each of the publications mentioned in this section and in other sections of the specification, are hereby incorporated by reference, each in its entirety.

SUMMARY

The present disclosure describes new exemplary systems for transferring power wirelessly from a transmitter to at least one receiver using a laser beam, that are capable of reacting to changing environments and situations in an efficient and safe manner, rendering them suitable for use in a public environment. A dynamic environment is inherently complex, and the systems of the present disclosure are constructed such that changes in the settings of the system parameters are adjusted in accordance with such changing situations. Unlike prior art systems which respond to critical events only by shutting down, the presently disclosed systems react to such changing environmental conditions and situations in a multi-faceted manner which provides an optimal response to any situation, and takes into account the need to maintain service under as many different envisaged situations as possible.

The presently disclosed systems are not limited in responding only to critical events, but also react to a multitude of situations which are not imminently dangerous, but may be undesired or associated with a high probability of an undesired event. The presently disclosed systems provide a more flexible approach that allows the system to avoid reaching the undesired situation, for example, instead of reacting to it when it becomes a critical event. Such flexibility is accomplished by the system providing multiple suitable reactions to different situations in order to allow continuous operation of the system in an efficient manner in a changing and diverse environment.

In addition to detecting imminent dangers, the exemplary laser based power supply systems of the present disclosure are able to identify many different situations in a complex, dynamically changing, and unpredictable environment. Examples of such situations include misuse of the system, incorrect installation, unauthorized use of the system, a moving and changing environment, changing lighting conditions, and moving transmitters or receivers. These situations would not be considered to be "critical events" by most prior art systems, although these situations may be associated with a high probability of an unwanted event.

Furthermore, unlike prior art safety systems that do not have fail-safe features for protection if the safety system is neutralized or bypassed, the presently disclosed laser based wireless power systems are resilient not only to situations that may occur during normal use (e.g. a person entering a beam by mistake), and misuse (e.g. wrong installation, wrong connection, or pressing the wrong button), but also to potential abuse (e.g. a cyber-intruder trying to cause the system to operate in an unsafe manner or a person trying to trick the system into sending power in the wrong direction by using hardware intervention).

An exemplary management system described in the present disclosure, which may be in addition to a hazard detection system, monitors the system state and external environment, and dynamically changes the system's operational parameters to decrease the probability of reaching potential unwanted situations. Thus, one function of such a system may be to prevent or reduce the risk of the system reaching a status where the hazard detection system would stop power transmission, thereby interrupting service. Additionally, the presently disclosed systems may prevent or reduce the risk of the system reaching a status in which the system would become vulnerable to attack. Other functions of the disclosed systems may be to prevent, or to react productively to situations that are undesirable for any reason, including, inter alia, from a standpoint of functionality, efficiency, or avoidance of abuse or misuse. Such productive reactions may include, for example, preventing an undesirable situation from happening or from worsening and/or collecting data for further analysis. Such prevention may be accomplished by association of probabilities of dangerous or unwanted situations to presently occurring situations within or external to the system. The flexibility and sensitivity of such systems, such as their ability to detect and react to many potentially disadvantageous or even potentially dangerous situations, may enable them to be suitable for public use in compliance with relevant regulations.

One exemplary system of the present disclosure provides a configuration for detecting a pattern that is associated with cyber intrusion, for example, repeated transmitted requests by a cyber-intruder in an attempt to find a valid key. Unlike most prior art systems, which respond to such a situation by eventually directing the laser in some unwanted direction, the present exemplary system has a configuration for detecting such a pattern, and provides generation of an automatic response to mitigate the unwanted situation and improve the system's resilience against such attempts.

Another exemplary system of the present disclosure detects and responds efficiently and safely to a low signal to noise ratio (SNR) situation. Most prior art systems either do not respond to such a situation, which may lead to unsafe operation, or may respond to such a low SNR situation by turning power transmission off. It may be possible to overcome a low SNR situation by increasing the time spent on identification and determination; however, such a solution is not advisable as a permanent solution because designing a system around such a solution would result in an inefficient system, spending too much of its time on identification and determination, thereby hindering efficiency and usability in normal situations.

In contrast, the present exemplary system evaluates collected data with regard to the current SNR value to allow proper identification of the situation, and then issues an appropriate response, such as spending more time on identification to improve the SNR ratio when the SNR is low, thus continuing to provide power even in those situations, and spending less time on identification when the SNR returns to an acceptable level.

One novel aspect of the currently disclosed systems is their ability, in many situations, to allow continuous operation of a system, by avoiding critical events instead of reacting to critical events, or by reconfiguring the system to react in constructive ways, other than shutting the system down in the event that an inevitable critical event happens, thereby increasing the efficiency of operation and ease of use of the system. As an example to illustrate this feature, if every day between 9 AM and 9:10 AM people are expected to pass by the office front door, which would block the beam and create a critical event, a preemptive solution could be to arrange that the system is directed to charge a device above the level of the people passing through the office, such as the smoke detector on the ceiling, as soon as the first person enters the door, thereby avoiding occurrence of the possibility of a critical event by the passage of the people. The systems proposed may be energy efficient supervision systems that are able to detect potentially wasteful patterns and to respond thereto, without performing unnecessary tests. The system is sufficiently advanced to detect a situation, analyze it, and issue an appropriate response. The proposed exemplary systems use specific algorithms to direct energy usage and allow continuous operation.

Such a proposed flexible management system monitors the many different information sources available from the system, and looks for patterns that correspond to different unwanted situations that are not imminent "critical events"—although they may develop into or result in "critical events"—and reacts in appropriate ways to mitigate the effects of such unwanted events should they occur, typically by modifying the operational parameters of the system. Such unwanted situations may have implications for the safety, efficiency, functionality or convenience of the system and may be caused by routine use, misuse or abuse. Such a system has the ability to perform a modification on the system configuration when such a pattern is detected. Furthermore, such a change is usually temporary, because when the conditions change again, the modification may need to be reversed. The system thus constantly monitors and manages, providing outputs and responses that are suitable for the current situation at any point in time.

One exemplary optical wireless power supply system may comprise a transmitter adapted to transmit wireless power, usually laser power, to a receiver which converts the wireless power into electrical power. The system is able to operate with any receiver which is adapted to operate with the control system described in this disclosure, generally by virtue of it being equipped with a receiver control unit and control unit malfunction detection system which has algorithms and communication protocols which will operate with the system. In some installations, the system includes internal or external controllers/control units, typically a computing device, or microcontroller, or a service over a network, which is or are capable of instructing the transmitter and/or receiver(s) how to operate.

The system may include a transmitter consisting of beam generator, and a beam deflection unit, a hazard detection system, a transmitter control unit (typically including memory and CPU but might also be other computing elements such as FPGA, microcontrollers, ASICs etc.) connected to the needed sensors, sensing both external parameters (such as time, temperature, and humidity) as well as internal parameters (e.g. temperature of components, direction of the beam, information from receivers and contents of the memory). The transmitter control unit is configured to collect data from various sensors, possibly including data from receivers to which it is intended to supply power, and compare the output from these sensors to data "signatures" that may be stored in a look-up table or a database, thus identifying potentially hazardous non-critical situations.

Such a table may be preloaded, dynamically generated, loaded via updates from time to time, user configurable, or generated in other ways. Such a table may include the needed automatic responses and the controller may be also connected to an execution unit capable of executing these automatic responses (such as laser driver, motor driver, email server, SMS gateway, warning signals, LEDs, lights, and alarms). The automatic responses may be achieved by changing one or more parameters in the system configuration that may even include the table used for identification of such non-critical situations.

Throughout this disclosure and as may be claimed, collection or obtaining of data from the sensors does not include data collection that was deliberately commenced by a factor external to the system, such as by a person pressing a button. Data from the sensors may be collected continuously, at predetermined time intervals, or may be initiated by the system upon detecting one or more relationships between the data and one or more signatures. Data collection on an ongoing basis and as initiated by the system itself allows for autonomous flexible management of the system.

The transmitter typically comprises a beam generator comprising a laser gain medium located in an optical resonator, a beam deflector and a transmitter control unit equipped with at least one transmitter malfunction detection device configured to detect a malfunction in the control unit and to cause the beam generator to switch to a safe state in case the control unit malfunctions. This may be done by comparing data to a predetermined signature and executing a response based on this comparison. As stated above, the control unit can be external to the transmitter or even remote. In addition, various system sensors are provided to "identify" the environment in which the system operates and, in most cases there is also a hazard detection system, which may be in the transmitter, the receiver, external to both, or distributed between these sites.

The hazard detection system detects hazards, typically critical events, and responds to them by typically either by reducing the power transmitted by the system or by diverting it, or by preventing power transmission entirely or some other response that is known to be safe. States of the system resulting from such actions arising from the hazard detection system, or as a result of an action initiated by the malfunction detection system, are defined in this disclosure as safe states, and are thuswise claimed. The hazard detection system may be realized using the controllers and sensors, but responds only to critical events. In some cases, the hazard detection system may be software using the same control unit and sensors as the current system but responding only to critical situations.

The transmitter control unit may be configured to detect situations corresponding to non-critical situations, corresponding to an increased probability of unwanted situations, and to automatically reconfigure the system so that the system's behavior, in case one or more such unwanted situations occur, is improved. In most cases, the reconfiguration of the system allows the system to continue to transmit power. Examples of this behavior are given hereinbelow.

Receivers with which the system is intended to work, may be equipped with an additional receiver control unit having another malfunction detection system (receiver malfunction detection system) which may be realized by programming the transmitter control unit to detect such malfunctions in the receiver control unit. This receiver malfunction detection system may be configured to cause the beam generator to switch to a safe state upon detection of a receiver controller malfunction. This may be done by comparing data to a predetermined signature and executing a response based on this comparison.

A safe state may be, but is not limited to, turning the laser off. It may also involve reducing the laser power, scanning the laser transmission direction, or diverting it to a safe direction.

Such a system can provide reliable control for the beam generator as well as detecting various situations that are unwanted or have a high probability of being/becoming unwanted and need to be attended to.

The system may include sensors that generate data that can be compared against one or more "signatures" to determine when each non-critical situation may have occurred. The list of common sensors that may be used in systems in accordance to the current invention comprises:

tracking sensor
position sensor
timer
time sensor—clock
position sensor
direction sensor
receiver orientation sensor
temperature sensors
transmitter emitted power sensor/power meter
receiver's received power sensor/power meter
communication link
wavelength sensor
transmitter's shock sensor
receiver's shock sensor
beam shape sensor
location table with associated information about what is in said location
Time table with associated information about what usually happens at that time
humidity sensor
gas sensor
range sensor
optical sensor
Other Indicative Sensors in the System The system gauges the measurement data from the sensors in accordance to a schedule that may be different for each sensor, or may be triggered by certain situations, and then compares these inputs against one or more "signatures" of unwanted situations that may be hard coded into the system, loaded into the system as either firmware or a data file, generated by the system itself, or edited by the user.

Upon detecting one or more of such "signatures" the system may react by performing one or more automatic actions typically intended to improve the situation. The duration of each action may vary from temporary to permanent, depending on the current situation of the system. Some of the possible automatic responses may be:

Reduce power levels to a safe level without turning the system off completely
Register the event and use it to improve statistics, or keep it for future analysis
Reduce power levels and reestablish connection once situation has changed
Rescan the room for receivers, this may be used to establish the correct number of receivers
Reschedule some or all receivers, for example, change the order of charging or the power transmitted to each receiver
Register the event in a log
Change the frequency of testing a certain position
Change the frequency of accessing a certain position or direction Change the duty cycle of accessing a certain position or direction Change the time schedule of accessing a certain position or direction Reboot the system Perform a self-check procedure Calibrate power meters and other sensors Alert the user Perform a thorough safety check to verify there are no risks Reduce power levels until the system cools down Register the position and time of the receiver, so that the system can improve statistics of from where devices are expected to return (e.g. a corner) and from where they are not (e.g. the door).

Throughout this disclosure and as may be claimed, the terms reduction of the risk, reduction of the effect, and the facilitation of recovering successfully are not meant to include scenarios that are either directly commanded and controlled by the user, or which involve complete system shutdown and no further operation from the system.

Throughout this disclosure and as may be claimed, the term malfunction detection system is meant to include various apparatuses or routines used to verify or test the operational condition of a control unit (e.g. receiver control unit, system control unit, CPU, controller, microcontroller, FPGA, or remote server) and to cause an automatic response should they appear to be in a non-working state. Examples include a countdown timer that is periodically reset, and when the countdown finishes, causes execution of an automatic response. Other examples may be thermal monitoring of a component wherein the system issues a response when a threshold temperature is reached. Such a response may be pinging a remote server and issuing a command if it does not respond, sending a first keyword to a controller and waiting for it to respond with a second keyword (and issuing a response if it doesn't), or various other keep-alive signals and the use of monitoring equipment.

There is therefore provided in accordance with an exemplary implementation of the systems provided in the present disclosure, a system for wireless power transmission comprising:

(i) a transmitter comprising a laser beam generator, the transmitter adapted to transmit the wireless power to at least one receiver configured to convert the laser beam into electrical power, the at least one receiver having a receiver control unit and a receiver control unit malfunction detection system associated therewith, the transmitter having at least two states, including at least one known safe state, the at least one receiver control unit malfunction detection system configured to cause the transmitter to switch to at least one of the safe states upon detection of a receiver control unit malfunction, (ii) a hazard detection system configured to detect the probability that human-accessible emission levels from the wireless power transmission system exceed a predetermined threshold, and if the probability exceeds a probability threshold, to cause the transmitter to switch to at least one of the safe states, (iii) a system control unit, and (iv) at least one system control unit malfunction detection system configured to cause the transmitter to switch to at least one of the safe states upon detection of at least one of a system control unit malfunction or a receiver control unit malfunction, wherein the system control unit is adapted to:

(a) store data relevant to the operation of the system, from a plurality of sensors adapted to obtain the data, at least one of the sensors being associated with at least one of the receivers, (b) compare at least a portion of the data from the plurality of sensors with at least one previously known signature, the signature associated with a non-critical event and with an increased probability of one or more potential unwanted situations, and (c) execute one or more responses based on the result of the comparison, initiation of the one or more responses occurring only during a time when the hazard detection system is not causing the transmitter to switch to any of the safe states, the responses configured to achieve at least one of:

reducing the probability of occurrence of one or more of the potential unwanted situations, reducing the effect of one or more of the potential unwanted situations, and facilitating successful recovery from one or more of the potential unwanted situations.

In such a system, the one or more responses may be configured to facilitate continued operation of the system. Alternatively and additionally, one or more of the responses may be further configured to achieve prevention of one or more of the potential unwanted situations over a predefined time period, or to achieve prevention of one or more of the potential unwanted situations until there is a predetermined relationship between a portion of the data and one of the signatures.

In any of the above described systems, the one or more signatures need not be based on the detection of human-accessible emission levels from the wireless power transmission system exceeding a threshold. Additionally, the previously known signatures may be encoded into the system by at least one of (i) the manufacturer, (ii) the user or (iii) the distributor of the system, (iv) service personnel, and (v) support personnel.

According to further implementations of the above described systems, at least one of the potential unwanted situations to which one or more of the signatures are associated, may be an attempt to cause the system to perform in an unsafe manner, or an attempt to cause the system to transmit the wireless power to an unauthorized receiver, or a situation which may indicate or be causing system component malfunction, or a situation in which the system is working while unsupported by the hardware of the system.

Additionally, in any of the above described systems, the one or more responses may be executed automatically. Furthermore, the one or more responses may comprise at least one of:

reducing power levels of the transmitted wireless power, performing additional checks or verifications, rescheduling the order or duration during which different receivers receive the wireless power, rebooting the system control unit, alerting a user, registering an event in a system log, and rebooting at least one of the receiver control units.

According to yet further implementations of the above described systems, the plurality of sensors may comprise one or more of:

a tracking sensor, a position sensor, a timer, a time clock, a direction sensor, a receiver orientation sensor,
a temperature sensor,
a transmitter emitted power sensor,
a receiver received power sensor,
a communication link,
a wavelength sensor,
a transmitter shock sensor,
a receiver shock sensor,
a beam shape sensor,
a set of data associated with time and place stored in a computer memory,
a humidity sensor,
a gas sensor,
a range sensor,
an optical sensor,
a receiver control unit malfunction detection system circuit
a system control unit malfunction detection system circuit, and
an indication from a control center over a communication means.

In yet further implementations of the systems, the receiver control unit malfunction detection systems may be located in at least one of the receiver control units and the system control unit.

Additionally, in any of the systems, comparing at least a portion of the data from the plurality of sensors with at least one previously known signature may comprise one or more comparisons, and the system control unit may be further adapted to identify at least one set of instructions based on one of the comparisons and execute one or more responses based on the at least one set of instructions. In such a case, the at least one set of instructions may comprise at least two sets of instructions, and one set of instructions of the at least two sets of instructions may take precedence over at least one other set of instructions of the at least two sets of instructions, according to a predetermined hierarchy. Alternatively, the at least one set of instructions may comprise the combination of at least two sets of instructions, the at least two sets of instructions having a predefined relationship that is the basis for one or more of the responses.

In the above described systems, comparing at least a portion of the data from the plurality of sensors with at least one previously known signature may comprise one or more comparisons, and one or more of the responses are each based on (i) at least one comparison between a first portion of data and a first signature and (ii) at least one comparison between a second portion of data and a second signature. Such one or more responses may then each be performed over a predetermined time window, or alternatively, until at least one of the at least one portion of data from at least one sensor matches at least one previously known safety signature.

According to yet further implementations of the above described systems, the transmitter may further comprise at least 1 of a beam deflection unit and a receiver identifier. In the latter case, the receiver identifier may utilize a code running on the control unit, which may be configured to verify data from sensors used for other functions.

In yet other exemplary implementations of these systems, the data relevant to the operation of the system may be data related to the environment in which the system is operating.

Additionally, in any such systems, the step of executing the one or more responses may be further based on a decision making system that prioritizes and manages the one or more responses to determine an optimal course of action.

Finally, according to yet further implementations of the systems described in the present disclosure, there is provided yet another system for wireless power transmission, comprising:
(i) a transmitter comprising a laser beam generator, the transmitter adapted to transmit the wireless power to at least one receiver configured to convert the laser beam into electrical power, the at least one receiver having a receiver control unit and a receiver control unit malfunction detection system associated therewith, the transmitter having at least two states, including at least one known safe state,
(ii) a hazard detection system configured to detect the probability that human-accessible emission levels from the wireless power transmission system exceed a predetermined threshold, and if the probability exceeds a probability threshold, to cause the transmitter to switch to at least one of the safe states,
(iii) a system control unit, and
(iv) at least one system control unit malfunction detection system,
wherein the system control unit is adapted to:
(a) store data relevant to the operation of the system, from a plurality of sensors adapted to obtain the data, at least one of the sensors being associated with at least one of the receivers,
(b) compare at least a portion of the data from the plurality of sensors with at least one previously known signature, the signature being associated with a non-critical event and with an increased probability of one or more potential unwanted situations, and
(c) execute one or more responses based on the result of the comparison, the responses configured to achieve at least one of:
reducing the probability of occurrence of one or more of the potential unwanted situations,
reducing the effect of one or more of the potential unwanted situations, and
facilitating successful recovery from one or more of the potential unwanted situations.

BRIEF DESCRIPTION OF THE DRAWINGS

The present invention will be understood and appreciated more fully from the following detailed description, taken in conjunction with the drawings in which.

DETAILED DESCRIPTION

Figure 1:
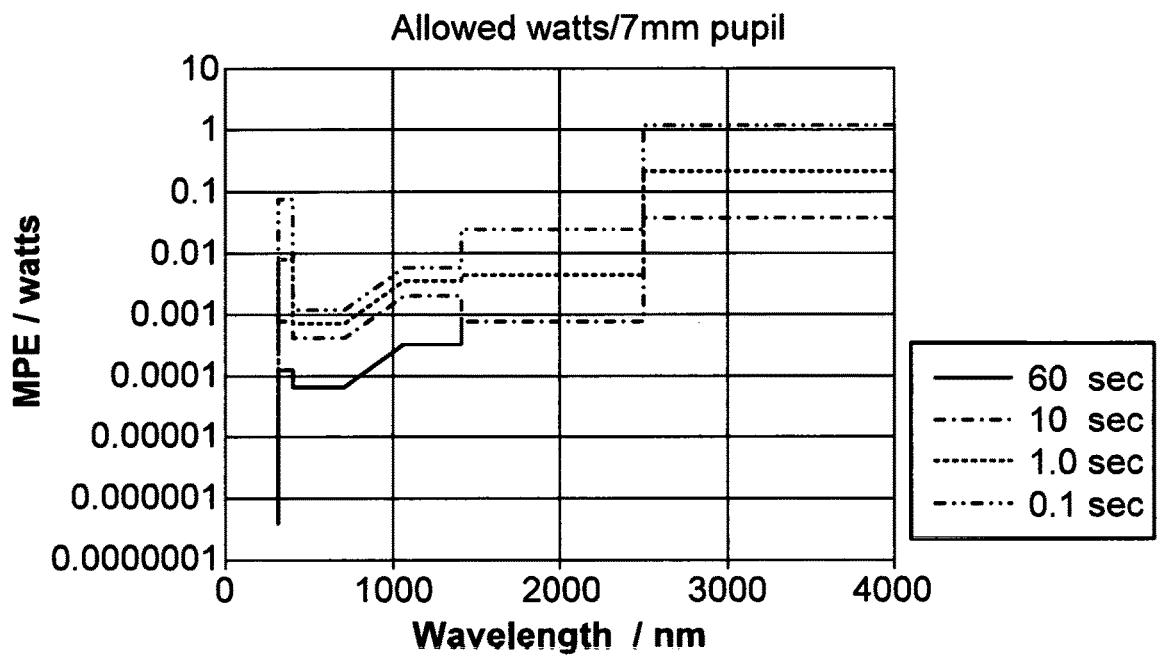
FIG. 1 is a graph of the MPE (Maximal Permissible Exposure Value) for class I lasers, according to the US, CFR 21, volume 8, revised on April 2014, Chapter I, Subchapter J part 1040, for 0.1-60 sec. of exposure.
Figure 2:
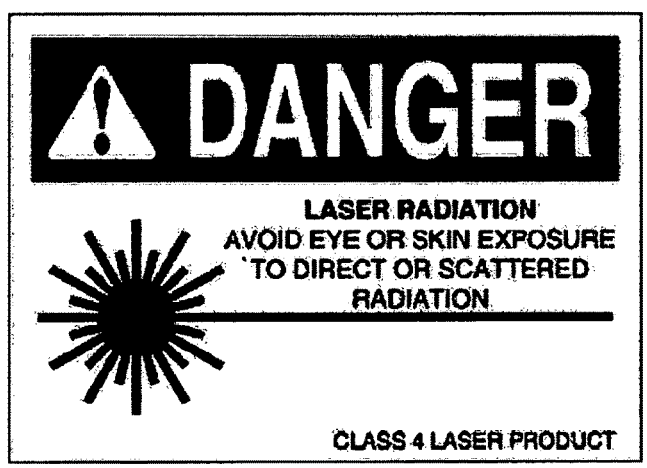
FIG. 2 is an example of a warning label mandatory for a Class 4 laser.
Figure 3:
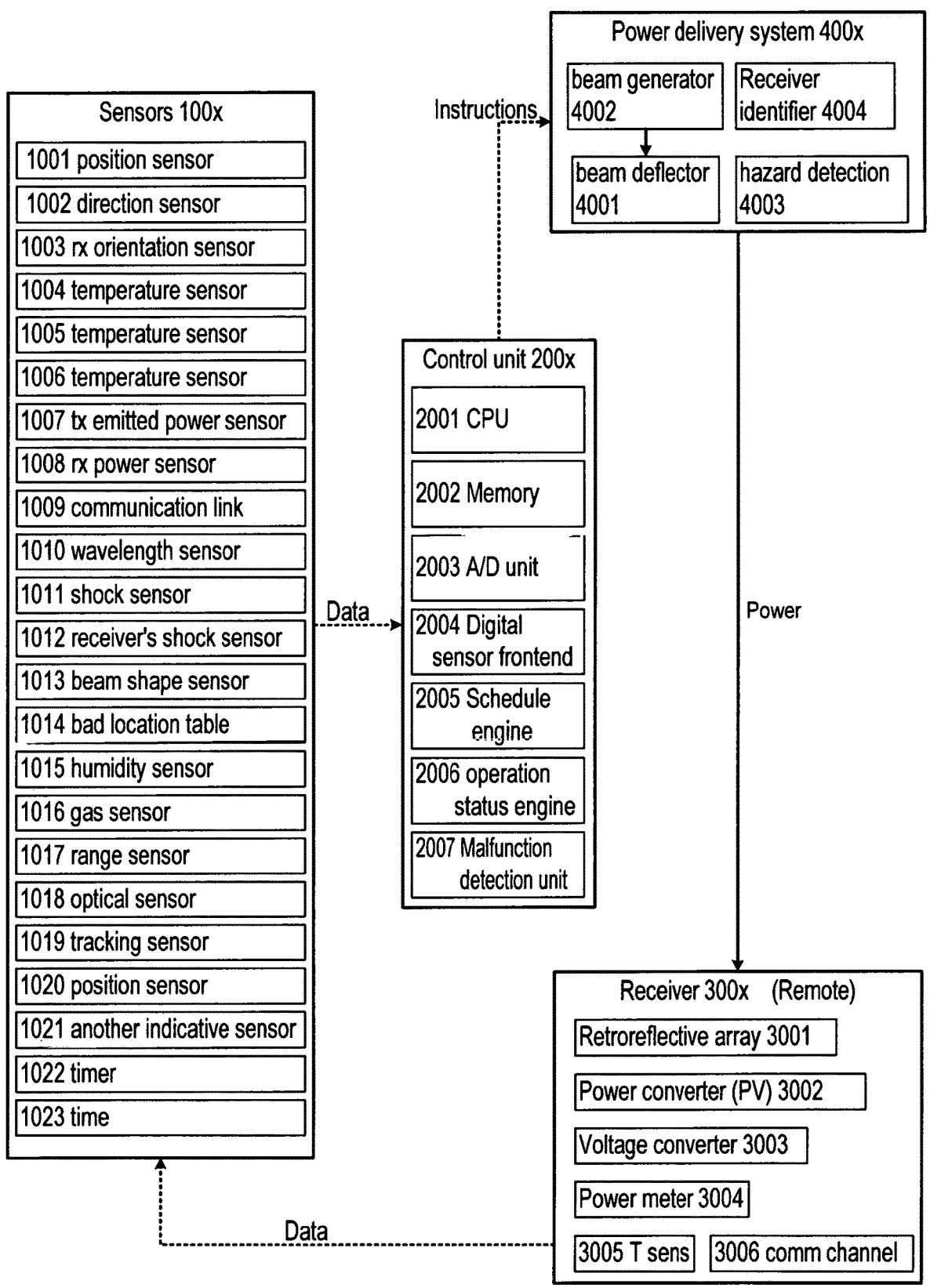
FIG. 3 shows a schematic block diagram of an exemplary system.

Reference is first made to FIG. 3, showing an exemplary schematic block diagram of a system in accordance to the current invention, including the separate functional blocks of the system, each with its own component constituent parts, and showing the four major flow paths of information, signals and power. It is to be understood though, that FIG. 3 shows only the basic parts of the system, divided up according to their general functions, and is not intended to be a comprehensive schematic of every functional part and every correlation between those functional parts.

Power delivery system 400x generates a wireless power beam, such as a laser beam, and directs it to a receiver 300x, which may be located in the system or external to the system, in accordance with instructions from the system control unit 200x. Although this drawing only includes one receiver, it is to be understood that the transmitter is generally adapted to transmit wireless power to a plurality of receivers, which may be located within the system or external to the system while having communications with the system control unit.

The system has multiple sensors 100x, which are spread throughout the various subsystems of the system, or which may be located outside the system. If the receiver 300x is located outside of the system, then the sensors associated with this receiver, such as the receiver orientation sensor and receiver power sensor, may be located external to the system as well.

The power delivery system 400x comprises the following subcomponents: the beam generator 4002, the beam deflector 4001, the hazard detection system (4003), and the receiver identifier (4004). In alternative systems of the present disclosure, the power delivery system 400x may comprise only the beam generator 4002, or may lack one or more of the beam deflector, the hazard detection system, and the receiver identifier. In such alternative systems, these components may be located external to the power delivery system, or may be lacking altogether.

The beam generator 4002 may be capable of generating a wireless power beam having different specifications, such as power, wavelength, beam shape, duty cycle, beam quality, $M^2$ value, and width, based on instructions from the system control unit 200x. The beam generator 4002 may be equipped with a power sensor (1007), a wavelength sensor (1010) and/or temperature sensor (1003-1006), a beam shape sensor (1013), and various other optical sensors (1018). These sensors may be used to ensure that any transmitted beams comply with the outputs and decisions of both the hazard detection system and those of the system control unit. For example, if the hazard detection system detects that human-accessible emission levels exceed a predetermined threshold, the hazard detection system may instruct the transmitter to switch to a low power safe state, and the power sensor 1007 may be used to verify that the correct power level is being used.

The beam deflector 4001 deflects the beam towards the remote receiver 300x. If there are additional authorized receivers that are compatible with the system, the beam deflector may be configured to deflect the beam towards each of the receivers. The beam deflector may be equipped with a tracking sensor (1019) and/or position sensor (1020), a direction sensor (1002), a receiver orientation sensor (1003), temperature sensors (1004-1006), an optical sensor (1018), and other sensors. These sensors may be used to ensure that the direction of any transmitted beam complies with the outputs and decisions of both the hazard detection system and those of the system control unit. For example, if the hazard detection system detects that human-accessible emission levels exceed a predetermined threshold, the hazard detection system may instruct the transmitter to switch to a safe state that involves diverting the beam, and the direction sensor 1002 may be used to verify that the correct direction of the beam is being used.

Although the hazard detection system 4003 is shown in this drawing to be within the power delivery system 400x, it includes both sensor and hardware components, and may also comprise a software routine to process the information in a control unit. The hazard detection system may thus be located in the transmitter, a receiver, distributed between the two, or external to both, and may be used to detect critical events, such as beam intrusions and other hazards. Upon such detection, the hazard detection system causes the system to quickly respond, in order to prevent the system from exceeding the maximal permissible exposure value (i.e. human-accessible emission threshold), the emission limit, or another limit which may be set by the user. The events detected by the hazard detection system are termed critical events, because, if there is no response for them within a short time, the system will exceed the maximal permissible exposure, or the exposure limit, or the fire hazard threshold or some other threshold, and will not operate in a safe manner. The hazard detection system may include or receive data from various sensors that are useful for identifying critical situations, such as a position sensor (1020), a direction sensor (1002), a receiver orientation sensor (1003), temperature sensors (1004-1006), a transmitter emitted power sensor (1007), a receiver's received power sensor (1008), a communication link (1009), a wavelength sensor (1010), a beam shape sensor (1013), a gas sensor (1016), a range sensor (1017), and an optical sensor (1018). For example, a large discrepancy between the power level measured by the transmitter emitted power sensor (1007) and the power level measured by the receiver's received power sensor (1008) may indicate that a human, animal, or object is within the path of the beam, which is a critical event.

The receiver identifier (4004), which is shown situated in the power delivery system, as with hazard detection system, may have hardware and software components. It is a unique element used to identify a legitimate or authorized receiver, and may be located anywhere in the system. The receiver identifier may perform this identification either optically or electronically, or through a combination of such methods. It may be viewed both as a sensor and as part of the hazard detection system. The receiver identifier may also be used to provide inputs to the system control unit for identification of potential unwanted situations. For example, frequent power requests by an unknown receiver may not be a critical event, but may be correlated to a high likelihood of a potential unwanted situation.

The receiver 300x, which may be located external to the system but is configured to communicate with the system, converts a beam emitted by transmitter 400x into electrical power. The receiver may comprise a retroreflection array (3001), a photovoltaic cell (3002), a voltage converter (3003), a power meter (3004), a temperature sensor (3005), and a communication module (3006). In alternative implementations in which there are multiple receivers to which the transmitter sends power, each of the receivers may have these components.

The retroreflection array (3001) may be identified by the receiver identifier (4004). The photovoltaic cell (3002) may be used for converting a beam into electrical energy. The voltage converter (3003) may bring the voltage to the required output voltage, and also may optimize the load viewed by photovoltaic cell (3002). The power meter (3004) may be based on measuring the current, voltage or other electrical property of the photovoltaic cell, or on another sensor or measurement. The power meter 3004 may also compensate based on temperature variations (such as measured by temperature sensor 3005), angle variation, historical measurement data, or a calibration graph. The communication module (3006) reports the measured power from the power meter as well as other data, typically via a wireless communication channel.

The system control unit 200x, is typically located in the transmitter, but may also be located outside the transmitter, or at least parts thereof, or even inside the receiver. The system control unit comprises a CPU (2001) and a memory unit (2002), which may be located within or outside of the CPU 2001. The system control unit also typically comprises an A/D unit (2003) which is used to convert signals from various sensors and detectors to digital signals that may be processed by control unit. The system control unit may also be equipped with a digital sensor front-end unit (2004), which is used to collect data from the various sensors, or sensors may also be polled directly by the CPU. The system control unit may also include a schedule engine (2005), providing the order and typical duration that each receiver should receive power. Such a schedule engine may be an external unit, an internal unit or a data structure inside the memory. The system control unit typically comprises an operation status engine (2006), which holds the current transmission status, such as the direction of the beam and power level of the beam. The current transmission status may be implemented in computer memory, mechanical status, electronic status, optical status or combination thereof. The control unit 200x also contains a malfunction detection system unit (2007) that monitors at least some of the internal components of the system control unit, and ensures that the system control unit is not caught in an unwanted operational state. In alternative implementations, the malfunction detection system may be located outside of the system control unit, but with communication to the system control unit. Thus, although the linguistic term "system control unit" as used in the description and as claimed, may give the impression that it is a single unit, it is to be understood that it can be distributed in several parts of the system, can comprise separate hardware circuit boards or subcomponents, and processes running software routines, and is essentially a complete control system. The term is therefore to be understood and interpreted thuswise.

The system is adapted to obtain and store data from at least one sensor unit (100x), but typically from a plurality of sensors, that provide information that is relevant to the operation of the system, and may be useful for identifying critical situations and/or potential unwanted situations. Some examples of common sensors are:

position sensor (1001)
direction sensor (1002)
receiver orientation sensor (1003)
temperature sensors (1004-1006)
transmitter emitted power sensor (1007)
receiver's received power sensor (1008)
communication link (1009)
wavelength sensor (1010)
transmitter's shock sensor (1011)
receiver's shock sensor (1012)
beam shape sensor (1013)
bad location table (1014)
humidity sensor (1015)
gas sensor (1016)
range sensor (1017)
optical sensor (1018)
tracking sensor (1019)
position sensor (1020)
another indicative sensor (1021)
timer (1022)
time sensor (1023).

During operation of the system, the data received from the various sensors (100x) is compared to identifying signatures stored in the memory unit (2002) of the control unit 200x, such signatures representing non-critical situations that correspond to an increased probability of one or more unwanted situations. The data from the sensors may be directly compared, or may first be converted or transmitted via another component before signature comparison. Data received from the sensors for signature comparison, may be converted data from the A/D unit (2003), from the digital sensor front-end unit (2004), from the malfunction detection unit (2007), from the operation status engine (2006), from the system's clock, or from another component.

Selected portions of data received from the sensors, either directly or indirectly, are then compared against the previously known signatures representing various potential unwanted situations. These comparisons may be performed by the CPU (2001) or by another processing unit. Upon detection of a probable future occurrence of an unwanted situation, the system control unit (200x) identifies at least one set of predetermined instructions based on the comparison. The system control unit may then execute a response based on these instructions, and typically reports the event in the system log (not shown in Figures). Such a response may be predetermined, or may be automatically generated by calculating from a set or parameters, or receiving from the internet, or randomly selecting from a list. Alternatively, the identified instructions may be input to a decision making system for further analysis to determine the optimal course of action.

The data from the system log may be used and analyzed to monitor the system's state, issue appropriate responses, to generate new sets of rules and/or to generate a summary for either the user or the system's manufacturer.

Figure 4:
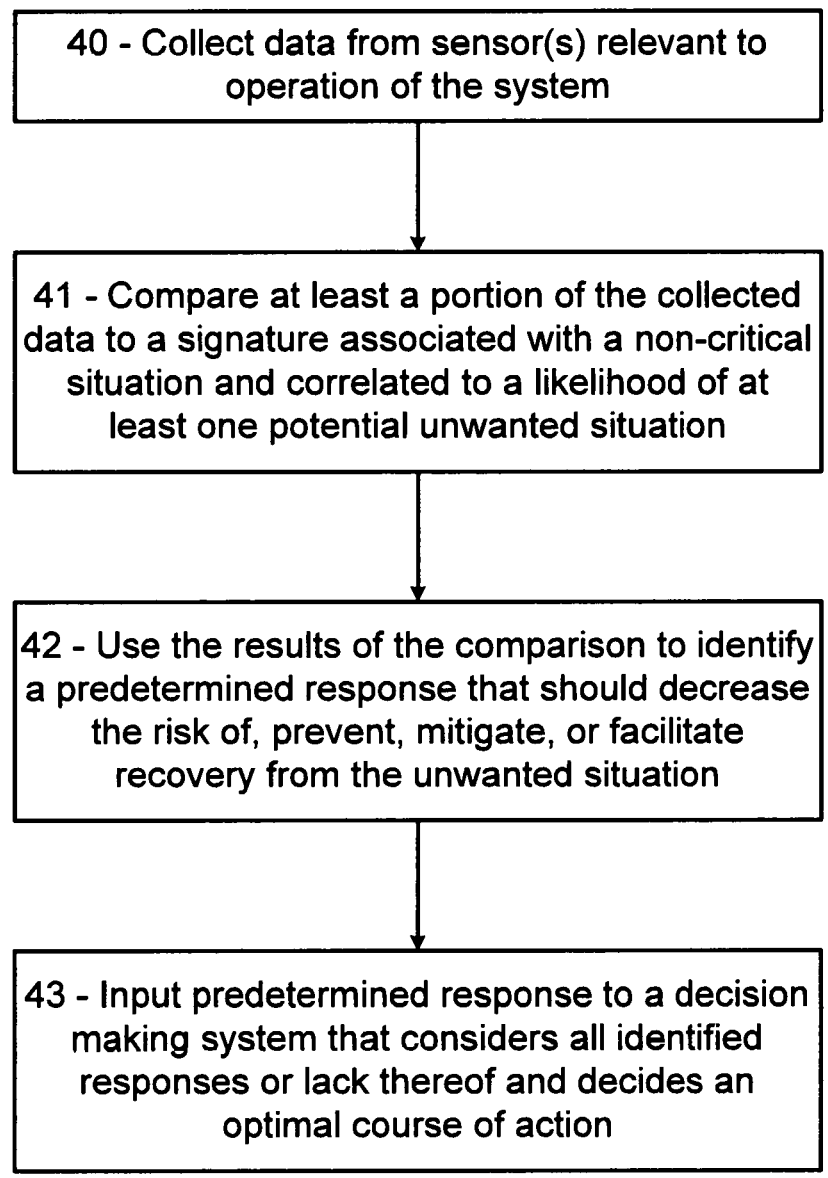
FIG. 4 shows an exemplary conceptual flowchart of the methods of the present disclosure.

Reference is made to FIG. 4, which shows a conceptual flowchart of one exemplary implementation of the methods which can be used in the system of the present disclosure. In step 40, sensors are used to gather data relevant to the operation of the system, which include data related to components in the system as well as data to the environment surrounding the system. The sensors may be located anywhere in the system or external to the system, such as in a receiver or in the transmitter. In step 41, at least a portion of the data derived from the sensors is compared to a preselected signature. Such a preselected signature is associated with a non-critical situation, generally a current non-critical situation that is correlated to a high likelihood of one or more potential unwanted, or even dangerous, situations occurring in the future. This is in contrast to the function of the hazard detection system, which is to handle current critical situations, which are generally already dangerous to humans.

In step 42, a predetermined response is identified based on the results of the comparison of the data to the signature. Although in this exemplary method, the identified response is predetermined, it is to be understood that in alternative implementations of the present disclosure, the response may be identified and determined at the same time, or the response may be determined after the identification. If the data does not bear resemblance to the signature, the appropriate response may be a lack of action, and the system may select a new portion of data or a new signature, or both, for comparison. However, if the selected portion of data matches the signature or shows a relevant relationship to the signature, the predetermined response identified may be a response that is intended to reduce the risk of one or more potential unwanted situations, prevent one or more potential unwanted situations, mitigate one or more potential unwanted situations, reduce the effect of one or more potential unwanted situations, or facilitate recovering successfully from one or more potential unwanted situations, or any combination thereof.

In step 43, all identified responses are entered into a decision making system that considers all identified responses or lack thereof and decides an optimal course of action. The decision making system may also consider inputs from malfunction detection systems and from the hazard detection system, for example to determine whether the system is in a safe state or is currently switching to a safe state and if so, which safe state. For example, if the hazard detection system is currently causing the system to switch to a safe state, it may be desirable to wait until the system resumes normal operation before initiating a response identified by the system control unit, since current situations of human-accessible emissions exceeding a threshold take precedence over an increased risk of unwanted situations.

As an alternative to step 43, the system may not have a decision making system or this system may not be utilized. In this case, an identified predetermined response would be executed automatically, regardless of any other identified automatic responses, and regardless of the status of other system parameters not directly related to the specific signature that identified the required response. This alternative may be more efficient in a system with a small number of sensors and limited possible responses.

However, the decision making system is especially advantageous when there are multiple responses being issued at approximately the same time. For example, two predetermined responses may be issued at approximately the same time and one response has higher precedence over another response. In this case, the decision making system may decide to initiate the response with higher precedence first and subsequently initiate the other response, or may altogether reject execution of the less important response. Another option may be to initiate both responses at the same time, but adjusting them such that the responses are simultaneously compatible. As another example, two predetermined responses may be identified that are likely to conflict with each other. In this case, the decision making system may select one of the responses to execute first and to subsequently execute the second response, or may adjust the responses such that the responses are simultaneously compatible, or may reject execution of a less important response. Another situation that may occur, for example, is that two identified predetermined responses are identical. In this case, it is generally more efficient to execute the predetermined response only once, which can be decided by the decision making system. Thus, in all of these situations, it is often advantageous to use a decision making system, instead of automatically executing identified predetermined responses.

The decision making system may be programmed with a hierarchy or precedence of instructions so that if there is a situation where the system receives two conflicting sets of instructions simultaneously, the system can respond appropriately. For example, if the system average temperature was previously high and power levels were reduced, but now the system has cooled down, an exemplary instruction would be to resume full/regular power levels. However, if simultaneous to this instruction to resume full/regular power levels, a receiver appears to have moved very quickly from one position to another, then this would result in an exemplary instruction to reduce power levels. Thus, in this example, the system is receiving two conflicting sets of instructions: (i) resume full/regular power levels and (ii) reduce power levels. The system in this example could be programmed to have "change from default value" instructions take precedence over the "restore to default value" instructions, and thus reducing power levels would take precedence over resuming full/regular power.

Furthermore, two or more identical or similar sets of instructions may be combined into one set of instructions or executed separately according to the programming. Sometimes there would be a need for two or more different responses, e.g. if "register the event in the log" is issued twice when a malfunction detection system for some component is not reporting a normal operation signal and simultaneously signal to noise of a sensor is low, then these two different and separate events should be registered in the log (two different responses to two identical instructions). On the contrary, sometimes two or more instructions would need to be combined to result in one response, for instance, if "reduce the power" is issued twice due to a receiver appearing to be revolving quickly and simultaneously average temperature is high, then the two identical instructions to reduce the power could be combined into one response of lowering power (one response to two identical instructions).

Multiple sets of instructions may be combined, analyzed, or compared in any way to provide the basis for the system responses. Thus the system is able to execute responses based on not only one set of data or based on one signature, but based on the entire database and all known comparisons of the data to the signatures.

Such a system can detect many different non-critical situations corresponding to increased probabilities of unwanted situations, and should then issue appropriate response(s). An appropriate response may be based on one or more detections of a non-critical situation. The following paragraphs are suggested as exemplary systems and methods, and the proposed systems may include numerous methods for detecting and responding to non-critical situations that are associated with an increased probability of an unwanted situation. Furthermore, these examples are simple, as they indicate responses based on detection of one non-critical situation, and the execution of an automatic response, but the system may employ methods that respond appropriately to detection of any number of non-critical situations or the lack thereof, such as by using the decision making system in accordance with FIG. 4.

As one example, the system may detect, after comparing at least a portion of collected data to a signature, frequent power requests by an unknown apparent receiver, transmitting different false credentials each time. Typically, a receiver transmits credentials to prove it can handle the transmitted power safety, as is described in the prior art. Directing the laser to anywhere other than a qualified receiver would potentially be dangerous. One of the methods typically used to identify receivers capable of handling the laser power, is by the receiver transmitting an ID and valid credentials, such as is described in U.S. Pat. No. 9,312,701 for "A System for Optical Wireless Power Supply", having common inventors with the present application. Since, in this example, the credentials, for example, the receiver's ID and key, are false, such a receiver is denied power by the system, since a receiver having false credentials may not have the required safety features to handle the transmitted power. There is therefore no immediate or certain risk involved in receiving wrong IDs and keys, as they cannot result in the laser beam being directed in a dangerous direction.

The above example is thus a non-critical event, although it has a risk of becoming a critical event, by the following scenario. In a situation of frequent power requests with repeated false credentials, there is an increased probability, but not certainty, that someone is trying to "hack" the system into sending power to an unauthorized receiver, or in an unauthorized direction. This is an unwanted situation for several reasons.

a. The cyber intruder may eventually decipher the key and succeed in making the system deliver power in an unauthorised manner.

b. While the system is busy checking and ignoring the many fake receivers it may provide poor service to authorized receivers (slower response time, lower efficiency, etc.)

One of the currently disclosed systems has a configuration for detecting such a pattern, for example repeated attempts to try different keys, by comparing data to a known signature. An automatic response may then be generated to mitigate the unwanted situation and improve the system's resilience against such attempts.

Such automatic responses for mitigating this situation may include steps such as:

requesting a secondary key from all or some of the receivers, increasing the response time for a connection request (to slow down the key finding algorithm and provide better service to other receivers), alerting the operator of the system, such as by a warning light or communication, or serving only known receivers for a predetermined time period, for instance, for 2 hours.

All such automatic responses are designed to temporarily improve the system's resilience to a specific potentially unwanted situation. These responses are typically temporal in nature, although the user may elect to make it permanent, or the system may automatically make it permanent in some cases.

A further exemplary method of the present disclosure relates to signal to noise ratio (SNR). Sometimes the signal to noise ratio (SNR) of the transmission link may become degraded, which may happen in a dynamic environment, for example from other electronic sources, making it difficult to accurately detect an object entering the beam. According to one exemplary disclosed system, such a low SNR situation could be detected and the system could respond productively. For example, the SNR could be determined by examining the historical statistical data from the sensors and evaluating the variance of data. Such a system would then evaluate the collected data with regard to the current SNR value to allow proper identification of the situation, and then would issue an appropriate response, such as spending more time on identification to improve the SNR ratio when the SNR is low, thus continuing to provide power even in those situations, and spending less time on identification when the SNR returns to an acceptable level.

Another exemplary non-critical situation is a sudden change in the position or speed of a receiver, which normally indicates a receiver being moved quickly. However, in rare cases it might also indicate an attempt to cause the system to continue tracking an unauthorized receiver, which is an unwanted situation. Detection of such sudden fast movement, or a lack of continuity of the receiver's position, is therefore an indication of an increased probability of an unwanted situation. A desired automatic response to detecting such a situation might be, for example, to suspend powering of the current receiver temporarily until the identification of the receiver has been verified again, which may be after it has stopped moving, and then to continue powering it when the possibility of following an unauthorized receiver has been eliminated.

In addition to detecting and preventing unauthorized intrusion attempts to the system, the presently disclosed methods and systems may be used to allow systems to respond to other non-critical situations such as, for example, accumulation of dust in the air vents of the cooling system that may be present in some wireless power systems. When dust accumulates in such places, the cooling efficiency drops, resulting in elevated temperatures of components. In this event of elevated component temperature, two different non-critical situations, corresponding to increased probabilities of several unwanted situations, may be detected by the system.

The first one is a general elevation of the temperature of many components that is determined to be unrelated to the temperature of the surroundings or the temperature of the receivers. In such a situation it is possible that the air vent is blocked and a suitable automatic response would be to alert the user, for example via a LED light, an application, an email, a text message, to check and clean the air vents.

A second non-critical situation may be detected when only a single component is working at an elevated temperature. This is associated with an increased probability that this component is approaching the end of its life, which should result in an automatic user notification, or, alternatively, that the current situation is overstressing that component. In such a case, a different working schedule may be introduced automatically. If the component is a sensor, the same situation may also produce poor signal to noise, and may, for example, result in an increased probability of a missed detection of a threat or threats. In such a situation, where one or more non-critical situations are detected that correspond to increased probabilities of unwanted situation(s), automatic adjustments of working parameters may be the solution.

Such a comprehensive flexible management system may comprise a plurality of algorithms and outcomes that have potential to be applied upon detection of different situations simultaneously, and may therefore require an organization system. Such a system may include, for example, a hierarchy or prioritization of outcomes, or a combination or delineation of outcomes, depending upon what is most beneficial for the system as a whole. There may simultaneous situations as disparate as, for example, detection of a fast moving receiver, elements that are overheated, and high atmospheric transmission loss to a receiver, resulting in possible loss of contact therewith. The exemplary systems provided should be capable of taking into account all of such factors before issuing an appropriate response or responses. Such examples of situations and responses are provided in detail in the paragraphs below. The constant monitoring of various parameters and the collection and storage of data allows for analysis of data over time and further improvements to the system algorithms. Storage of data also allows algorithms to correspond to data collected over long periods of time, as well as over short periods.

A detectable non-critical situation corresponding to an increased probability of an unwanted situation, may occur when the receiver moves outside the maximal effective distance of the safety system. This maximum effective distance may be dependent on other variables, such as power. In such a situation, the receiver is still within the range of the tracking system or some other sub system, and is statistically expected to return to the operative system range in a short time. In such a case, the situation may be that turning the power off completely will lead to loss of position data and the need to search for the receiver again and establish that there is a clear line of sight again. In such a situation, there is an increased probability of losing track of the receiver, and providing poor service to it, which is an unwanted situation. Such a situation may correspond, or may statistically correspond, to detection of the range and position of the current receiver being outside the working range, or to poor signal to noise in the tracking sensors, the range sensor, or another indicative parameter. Upon detecting such a situation, the system identifies pre-programmed instructions, and a suitable automatic response based on these instructions may be to reduce power to a safe limit but not to turn it off completely, and to register the position and time of the receiver, so that the system can improve statistics of the location to which the receiver is expected to return and to where it is not expected to return. For example, if in such a situation, a receiver is detected as moving out of range towards a corner of a room, there is a high likelihood that the receiver is expected to return to the maximal effective distance of the safety system, and therefore the system should reduce power and register the position and time of the receiver to await its return to within range. In the likely event that the receiver does return to the range, the system does not need to restart in the same way as would have been done in the case of a complete shutdown, searching for the receiver again without position data and reestablishing that there is a clear line of sight. As a contrary example, if the receiver is moving towards a door, then it would be likely that its user is leaving, and is not going to return, so an appropriate response may be to turn the power off completely. Delineation between these two scenarios is an example of how guided algorithms promote energy efficiency.

Another detectable non-critical situation corresponding to an increased probability of an unwanted situation may occur when a malfunction detection system for some component is not reporting a normal operation signal. In such a case, the situation may be that the component monitored by the malfunction detection system has stopped functioning, but it may also be that the malfunction detection system itself is in error or that the system clock is out of sync, or some other problem. Thus, in such a situation, there is an increased probability of a malfunction detection system component failure, which is an unwanted situation. Such a situation may correspond (or may statistically correspond) to the detection of time elapsed since the last normal signal from the malfunction detection system being greater than some threshold value in the timer sensor. Upon detecting this non-critical situation, the system should identify pre-programmed instructions. A suitable automatic response, based on these instructions, may be to reboot the system, register the event in the system log, notify the user, and perform a safety check to verify there are no detected risks Another detectable non-critical situation corresponding to an increased probability of an unwanted situation may occur when a receiver appears to have moved very quickly from one position to another. In such a case, the situation may be that someone is trying to quickly replace a legitimate receiver with a fake one, and thus in such a situation there is an increased probability of the system sending power to a receiver incapable of accepting it, which is an unwanted situation. Such a situation may correspond (or may statistically correspond) to detection of position changes between consecutive measurements being greater than some threshold value in the position sensor. A suitable automatic response, may be to reduce power levels, stop connection to the receiver temporarily, and reestablish connection once the motion of the receiver has stopped.

Another detectable non-critical situation corresponding to an increased probability of an unwanted situation, may occur when a receiver appears to be revolving quickly (e.g. changes its orientation). In such a case, the situation may be that someone is trying to quickly replace a legitimate receiver with a fake one, and thus there is an increased probability of power being sent to a receiver incapable of accepting it, which is an unwanted situation. Such a situation may correspond (or may statistically correspond) to detection of rapid changes in the signal in the position tracking sensors and/or the receiver orientation sensor. A suitable automatic response may be to reduce power levels, stop connection to the receiver temporarily, and then reestablish connection once the receiver motion has stopped Another detectable non-critical situation corresponding to an increased probability of an unwanted situation, may occur when there appear to be too many receivers around the transmitter. In such a case, the situation may be that one or more receivers are counted more than once due to some error, and thus this situation contributes to an increased probability of time loss used trying to search for all the non-existing receivers, which is an unwanted situation. Such a situation may correspond (or may statistically correspond) to detection of the receiver count being greater than the statistically acceptable number in the receiver counter. A suitable automatic response, may be to rescan the room and establish the correct number of receivers.

Another detectable non-critical situation corresponding to an increased probability of an unwanted situation may occur when the signal to noise of a sensor is low. In such a case, the situation may be that the sensor is not performing optimally and thus this situation is associated with an increased probability of misdetection of some foreign object by the hazard detection system, which is an unwanted situation. Such a situation may correspond (or may statistically correspond) to detection of large variance in measurements in any sensor. Such large variation in consecutive measurements usually does not indicate rapid changes in the situation, but rather often indicates an increased noise level compared to the signal. For example, if a temperature of a component is measured to be 150 degrees at a certain point of time, and a second later is measured to be −60 degrees, this usually means that the temperature sensor is defective, not that the temperature varies quickly. A suitable automatic response to such a situation may be to register the event in the log, lower the power level, and alert the user or the service center. Thus, rather than the system shutting down in response to falsely detected foreign objects, the system is able to identify the root cause of the problem and run continuously and efficiently.

Another detectable non-critical situation corresponding to an increased probability of an unwanted situation may occur when a single component's temperature is high. In such a case, the situation may be that either the component is approaching its end of life or that there is a temporary overload on the component. Thus, this situation is associated with an increased probability of component failure, which is an unwanted situation. A suitable automatic response, designed to reduce the incumbent risk of this unwanted situation, may be to reduce power levels, reschedule and power other receivers (if the overheated component is in a certain receiver), and register the event in the log.

Another detectable non-critical situation corresponding to an increased probability of an unwanted situation may occur when the system average temperature is hot as compared to a predetermined threshold. In such a case, the situation may be that the system is emitting more thermal energy than normal. Thus, there is an increased probability of a shortened system lifetime, which is an unwanted situation. Such a situation may correspond (or may statistically correspond) to detection of high temperatures across various sensors in the system including temperature sensors. A suitable automatic response, may be to facilitate successful recovery by reducing power levels until the system cools down.

Another detectable non-critical situation corresponding to an increased probability of an unwanted situation may occur when the system repeatedly tests a position for a receiver, but there is no receiver there. In such a case, the situation may be that there is an object there which appears similar to the system and thus this situation corresponds to an increased probability of wasting system resources, which is an unwanted situation. Such a situation may correspond (or may statistically correspond) to detection of repeated misidentification of a receiver in the same position in the position sensor. A suitable automatic response, may be to reduce the frequency of testing this position and to register the event in the log.

Another detectable non-critical situation corresponding to an increased probability of an unwanted situation may occur when the atmospheric loss of power when transmitting to a receiver exceeds a threshold. In such a case, the situation may be that there is a lot of dust or smoke in the air, and this situation contributes to an increased probability of optics needing cleaning or of a fire, which is an unwanted situation. Such a situation may correspond (or may statistically correspond) to detection of large optical loss between the transmitter and the receiver in the power meter sensors in the transmitter and the receiver. A suitable automatic response may be to alert the user, lower power levels, and register the event in the log.

Another detectable non-critical situation corresponding to an increased probability of an unwanted situation may occur when the laser wavelength drifts or changes. In such a case the situation may be that the laser diode is too hot or too cold, or the current may be too high, and this situation is associated with an increased probability of the system exceeding the safety thresholds, which is an unwanted situation. Such a situation may correspond (or may statistically correspond) to detection of a different wavelength in the wavelength sensor than noted in the system guidelines. A suitable automatic response, designed to reduce the risk of the unwanted situation is to lower power levels and reboot the system.

Another detectable non-critical situation corresponding to increased probability of an unwanted situation may occur when the receiver or transmitter receives a mechanical shock. In such a case, the situation may be that some component moved out of alignment and thus there is an increased probability of malfunction, which is an unwanted situation. Such a situation may correspond (or may statistically correspond) to detection of a mechanical shock in the shock sensor. A suitable automatic response, may be to perform a self-check procedure.

Another detectable non-critical situation corresponding to an increased probability of an unwanted situation may occur when the system is turned on after a long time it has been off. In such a case, the situation may be that the system suffered a mechanical shock during transportation, and thus there is an increased probability of malfunctions, which is an unwanted situation. Such a situation may correspond (or may statistically correspond) to detection of long time that has lapsed since last usage in the timer sensors. A suitable automatic response may be to perform a self-check procedure, rescan the room, calibrate power meters and other sensors, and alert the user.

It is to be understood that in any of these examples, the identified automatic responses may either be executed without further analysis, or may be entered into a decision making system that prioritizes and manages the multiple identified responses, or lack thereof, to determine an optimal course of action. The decision making system may also consider inputs from the hazard detection system, whether the system is currently in a safe state, which safe state the system is currently in, and inputs from receiver and transmitter malfunction detection unit systems.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A system for wireless power transmission comprising:
   (i) a transmitter comprising a laser beam generator, said transmitter adapted to transmit said wireless power to at least one receiver configured to convert said laser beam into electrical power, said at least one receiver having a receiver control unit and a receiver control unit malfunction detection system associated therewith, said transmitter having at least two states, including at least one known safe state, said at least one receiver control unit malfunction detection system configured to cause said transmitter to switch to one of said at least one known safe state upon detection of a receiver control unit malfunction;
   (ii) a hazard detection system configured to detect the probability that human-accessible emission levels from said wireless power transmission system exceed a predetermined threshold, and if said probability exceeds a probability threshold, to cause said transmitter to switch to one of said at least one known safe state;
   (iii) a system control unit; and
   (iv) at least one system control unit malfunction detection system configured to cause said transmitter to switch to one of said at least one known safe state upon detection of at least one of a system control unit malfunction or a receiver control unit malfunction;
   wherein said system control unit is adapted to:
   (a) store data relevant to the operation of said system, from a plurality of sensors adapted to obtain said data, at least one of said sensors being associated with one of said at least one receiver;
   (b) compare at least a portion of said data from said plurality of sensors with at least one previously known signature, said signature associated with a non-critical event and with an increased probability of one or more potential unwanted situations; and
   (c) execute one or more responses based on the result of said comparing step, initiation of said one or more responses occurring only during a time when said hazard detection system is not causing said transmitter to switch to any of said at least one known safe state, said responses configured to achieve at least one of:
   reducing the probability of occurrence of one or more of said potential unwanted situations;
   reducing the effect of one or more of said potential unwanted situations; and facilitating successful recovery from one or more of said potential unwanted situations.

2. The system according to claim 1, wherein said one or more responses are configured to facilitate continued operation of said system.

3. The system according to claim 1, wherein one or more of said responses are further configured to achieve prevention of one or more of said potential unwanted situations over a predefined time period.

4. The system according to claim 1, wherein one or more of said responses are further configured to achieve prevention of one or more of said potential unwanted situations until there is a predetermined relationship between a portion of said data and one of said at least one previously known signature.

5. The system according to claim 1, wherein said at least one previously known signature is not based on said detection of human-accessible emission levels from said wireless power transmission system exceeding a threshold.

6. The system according to claim 1, wherein said at least one previously known signature is encoded into the system by at least one of (i) the manufacturer, (ii) the user or (iii) the distributor of the system, (iv) service personnel, and (v) support personnel.

7. The system according to claim 1, wherein at least one of said potential unwanted situations to which said at least one previously known signature is associated, is an attempt to cause the system to perform in an unsafe manner.

8. The system according to claim 1, wherein at least one of said potential unwanted situations to which said at least one previously known signature is associated is an attempt to cause said system to transmit said wireless power to an unauthorized receiver.

9. The system according to claim 1, wherein at least one of said unwanted situations to which said at least one previously known signature is associated is a situation which may indicate or be causing system component malfunction.

10. The system according to claim 1, wherein at least one of said unwanted situations to which said at least one previously known signature is associated is a situation in which said system is working while unsupported by the hardware of said system.

11. The system according to claim 1, wherein said one or more responses are executed automatically.

12. The system according to claim 1, wherein said one or more response comprises at least one of:
reducing power levels of said transmitted wireless power;
performing additional checks or verifications;
rescheduling the order or duration during which different receivers receive said wireless power;
rebooting said system control unit;
alerting a user;
registering an event in a system log; and
rebooting at least one of said receiver control units.

13. The system according to claim 1 wherein said plurality of sensors comprises one or more of:
a tracking sensor;
a position sensor;
a timer;
a time clock;
a direction sensor;
a receiver orientation sensor;
a temperature sensor;
a transmitter emitted power sensor;
a receiver received power sensor;
a communication link;
a wavelength sensor;
a transmitter shock sensor;
a receiver shock sensor;
a beam shape sensor;
a set of data associated with time and place stored in a computer memory;
a humidity sensor;
a gas sensor;
a range sensor;
an optical sensor;
a receiver control unit malfunction detection system circuit a system control unit malfunction detection system circuit; and
an indication from a control center over a communication means.

14. The system according to claim 1, wherein said at least one receiver control unit malfunction detection system is located either in one of said at least one receiver control unit, or in said system control unit.

15. The system according to claim 1, wherein comparing at least a portion of said data from said plurality of sensors with at least one previously known signature comprises one or more comparisons, and said system control unit is further adapted to identify at least one set of instructions based on one of said comparisons and execute one or more responses based on said at least one set of instructions.

16. The system according to claim 15, wherein said at least one set of instructions comprises at least two sets of instructions, and one set of instructions of said at least two sets of instructions takes precedence over at least one other set of instructions of said at least two sets of instructions according to a predetermined hierarchy.

17. The system according to claim 15, wherein said at least one set of instructions comprises the combination of at least two sets of instructions, said at least two sets of instructions having a predefined relationship that is the basis for one or more of said responses.

18. The system according to claim 1, wherein comparing at least a portion of said data from said plurality of sensors with at least one previously known signature comprises one or more comparisons, and one or more of said responses are each based on (i) at least one comparison between a first portion of data and a first signature and (ii) at least one comparison between a second portion of data and a second signature.

19. The system according to claim 1, wherein said one or more responses are each performed over a predetermined time window.

20. The system according to claim 1, wherein said one or more responses are performed until at least a portion of data from at least one sensor matches at least one previously known safety signature.

21. The system according to claim 1, wherein said transmitter further comprises a beam deflection unit.

22. The system according to claim 1, further comprising a receiver identifier.

23. The system according to claim 1, wherein said data relevant to the operation of said system is data related to the environment in which said system is operating.

24. The system according to claim 1, wherein said executing one or more responses is further based on a decision making system that prioritizes and manages said one or more responses to determine an optimal course of action.

25. A system for wireless power transmission comprising:
(i) a transmitter comprising a laser beam generator, said transmitter adapted to transmit said wireless power to at least one receiver configured to convert said laser beam into electrical power, said at least one receiver having a receiver control unit and a receiver control unit malfunction detection system associated therewith, said transmitter having at least two states, including at least one known safe state;

(ii) a hazard detection system configured to detect the probability that human-accessible emission levels from said wireless power transmission system exceed a predetermined threshold, and if said probability exceeds a probability threshold, to cause said transmitter to switch to at least one of said safe states;

(iii) a system control unit; and (iv) at least one system control unit malfunction detection system, wherein said system control unit is adapted to:

(a) store data relevant to the operation of said system, from a plurality of sensors adapted to obtain said data, at least one of said sensors being associated with at least one of said at least one receiver;

(b) compare at least a portion of said data from said plurality of sensors with at least one previously known signature, said signature associated with a non-critical event and with an increased probability of one or more potential unwanted situations, and (c) execute one or more responses based on the result of said comparing, said responses configured to achieve at least one of:

reducing the probability of occurrence of one or more of said potential unwanted situations;

reducing the effect of one or more of said potential unwanted situations, and facilitating successful recovery from one or more of said potential unwanted situations.

* * * * *